United States Patent
James et al.

(10) Patent No.: US 11,458,455 B2
(45) Date of Patent: Oct. 4, 2022

(54) PROCESS FOR PREPARING SHAPED METAL-ORGANIC FRAMEWORK MATERIALS

(71) Applicant: MOF Technologies Limited, Belfast (GB)

(72) Inventors: Stuart James, Belfast (GB); Paschal McCloskey, Belfast (GB); Mark Garrett, Belfast (GB); Conor Hamill, Belfast (GB); Jose Casaban-Julian, Belfast (GB); John Breen, Belfast (GB)

(73) Assignee: MOF Technologies Limited, Belfast (GB)

( * ) Notice: Subject to any disclaimer, the term of this patent is extended or adjusted under 35 U.S.C. 154(b) by 183 days.

(21) Appl. No.: 16/772,359

(22) PCT Filed: Dec. 6, 2018

(86) PCT No.: PCT/GB2018/053541
§ 371 (c)(1),
(2) Date: Jun. 12, 2020

(87) PCT Pub. No.: WO2019/116007
PCT Pub. Date: Jun. 20, 2019

(65) Prior Publication Data
US 2021/0069676 A1    Mar. 11, 2021

(30) Foreign Application Priority Data
Dec. 13, 2017 (GB) ........................... 1720801

(51) Int. Cl.
B01J 20/30 (2006.01)
B01J 20/22 (2006.01)
(Continued)

(52) U.S. Cl.
CPC ......... *B01J 20/3007* (2013.01); *B01J 20/226* (2013.01); *B01J 20/3035* (2013.01)

(58) Field of Classification Search
None
See application file for complete search history.

(56) References Cited

U.S. PATENT DOCUMENTS

| | | | |
|---|---|---|---|
| 2003/0222203 A1 | 12/2003 | Sun et al. | |
| 2006/0099398 A1 | 5/2006 | Hesse et al. | |
| 2016/0176070 A1* | 6/2016 | James | B01J 20/226 556/37 |

FOREIGN PATENT DOCUMENTS

| | | |
|---|---|---|
| WO | WO-2007/023295 A2 | 3/2007 |
| WO | WO-2014/191725 A1 | 12/2014 |

(Continued)

OTHER PUBLICATIONS

Combined GB Search and Exam Report on GB1720801.8 dated Aug. 20, 2018 (5 pages).

(Continued)

*Primary Examiner* — Daniel Berns
(74) *Attorney, Agent, or Firm* — Foley & Lardner LLP

(57) ABSTRACT

A process for the preparation of a shaped MOF, the process comprising: providing a first reactant comprising at least one metal in ionic form and a second reactant comprising at least one organic ligand capable of associating with said metal in ionic form, and optionally a solvent; allowing the first and second reactants to react to form a MOF; and forming a shaped body directly from the mixture of step b) using an extruder or continuous kneader; wherein the initial ratio of the at least one metal in ionic form to the at least one organic ligand is controlled such that shaped bodies having a minimum defined crush strength are formed without the use of an external binder or lubricant.

8 Claims, 1 Drawing Sheet

(51) Int. Cl.
*C07F 3/00* (2006.01)
*C07F 1/00* (2006.01)

(56) References Cited

FOREIGN PATENT DOCUMENTS

| | | |
|---|---|---|
| WO | WO-2017/089344 A1 | 6/2017 |
| WO | WO-2017/089410 A1 | 6/2017 |

OTHER PUBLICATIONS

International Search Report and Written Opinion on PCT/GB2018/053541 dated Dec. 2, 2019 (9 pages).

\* cited by examiner

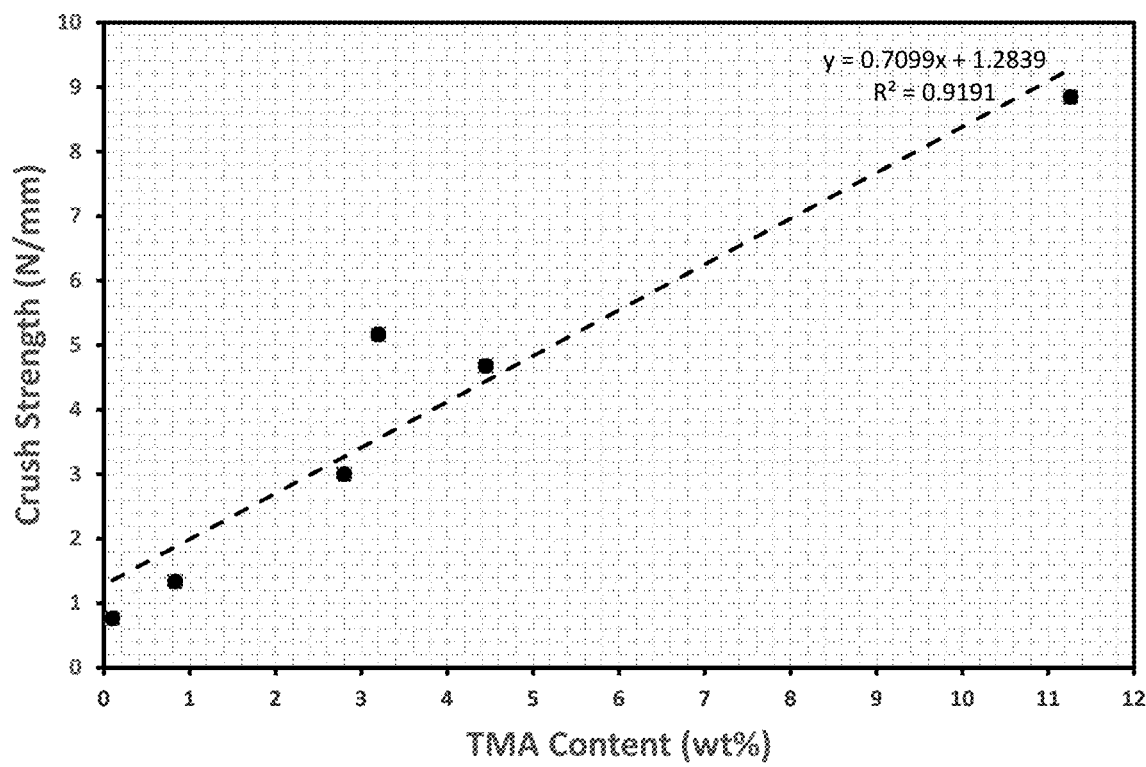

PROCESS FOR PREPARING SHAPED METAL-ORGANIC FRAMEWORK MATERIALS

CROSS-REFERENCE TO RELATED APPLICATIONS

This application claims priority to and the benefit of P.C.T. Patent Application No. PCT/GB2018/053541, titled "PROCESS FOR PREPARING SHAPED METAL-ORGANIC FRAMEWORK MATERIALS," and filed on Dec. 6, 2018, which claims priority to and the benefit of GB Patent Application No. 1720801.8, titled "PROCESS FOR PREPARING SHAPED METAL-ORGANIC FRAMEWORK MATERIALS," and filed on Dec. 13, 2017, the contents of all of which are hereby incorporated herein by reference in its entirety for all purposes.

The present invention relates to processes for preparing shaped metal-organic framework materials.

Metal-organic frameworks, hereinafter 'MOFs', are crystalline or non-crystalline, porous metal-organic compounds, having particular pore sizes or pore distributions and large specific surface areas. MOFs typically comprise an abundance of sites where gas molecules can adsorb to the material, making them ideally suited to high-density storage of a range of gases, including methane. MOFs also have low bulk volumes due to their porosity, making them extremely light. MOFs have therefore become the focus of intense research in recent years, due to their potential applications in the fields of gas storage, carbon capture, separation, drug storage and delivery, and sensors, among others.

Conventional methods of preparing MOFs generally result in the production of MOFs in powder or crystalline form. However, these forms are not well suited to these industrial applications. Accordingly, the MOFs are typically formed into shaped bodies, such as pellets, before commercialisation. In order to form these shaped materials, the MOF powders are typically forced together via the application of high pressure in the presence of a binder or lubricant.

U.S. Pat. No. 7,931,960 B2 discloses shaped bodies comprising a metal-organic framework material, wherein the shaped body is obtained by pressing or extruding the powdered MOF under high pressure into a shaped body in the presence of a binder.

U.S. Pat. No. 6,893,564B2 discloses shaped bodies prepared by molding a composition comprising a porous metal-organic framework material in the presence of a binder, such as hydrated alumina or other aluminium containing binders, mixtures of silicon and aluminium compounds, silicon compounds, clay materials, alkoxysilanes, amphiphilic substances and graphite.

WO2017/089344 A1 discloses a process for the preparation of a molding composition comprising preparing a mixture of an at least bidentate organic compound or a salt thereof, a metal salt and a lubricant. A solvent comprising 25 to 60% by volume of an alcohol and 40 to 75% by volume of water is added to the mixture, and the resulting molding composition is converted into shaped bodies by extrusion in the presence of a lubricant.

WO2017/089410 A1 discloses a process for the preparation of a metal-organic framework comprising preparing a dry composition by mixing at least one metal salt and at least one bidentate organic compound or a salt thereof, adding a solvent comprising 25 to 75% by volume of at least one alcohol and 25 to 75% by volume of water to the dry composition, and mixing the composition to obtain a homogeneous powder. The composition can then be molded into shaped bodies, in the presence of a binder or lubricant such as graphite, polysaccharide or poly(ethylene oxide).

However, the prior art methods such as those described above, generally require the presence of binders or lubricants in order to form shaped bodies of sufficient crush strength for use in commercial applications, thereby resulting in reduced character of the MOF. Highly pressurised systems (typically 120 bar) are also used to form the shaped bodies, leading to decreased surface area of the MOF.

US2016/0151762 A1 discloses the formation shaped materials from pre-formed MOFs in the presence of a scaffold, which aims to strengthen the metal-organic framework structure before the application of mechanical stress. The mechanical formation techniques, which include granulation, centrifugal agglomeration and tablet pressing, utilize pressures of at least 25,000 psi to form the shaped materials.

It is an object of the present invention to provide an improved process for the preparation of shaped MOFs. Ideally, an improved process should be capable of providing a shaped MOF with high surface area and/or high crush strength. Other advantages would include increased efficiency in terms of complexity, materials, safety, time, cost or energy compared with known processes. A continuous process for forming shaped MOFs directly from the starting materials would be a distinct advantage.

According to the present invention there is provided a process for the preparation of a shaped MOF, the process comprising:

a) providing a first reactant comprising at least one metal in ionic form and a second reactant comprising at least one organic ligand capable of associating with said metal in ionic form, and optionally a solvent;

b) allowing the first and second reactants to react to form a MOF; and c) forming a shaped body directly from the mixture of step b) using an extruder or continuous kneader;

wherein the initial ratio of the at least one metal in ionic form to the at least one organic ligand is controlled such that shaped bodies having a crush strength of at least 6.9 N/mm can be formed without the use of an external binder or lubricant.

The inventors have advantageously determined that careful control of the initial ratio of the starting materials for the MOF, leads to a composition which can be used to produce shaped MOFs in the absence of external binders or lubricants. That is, the crush strength of the shaped bodies can be adjusted by careful control of the ratios of the starting materials, such that shaped bodies having sufficient crush strength for commercial application (i.e. approximately 6.9 N/mm) can be formed in the absence of external binders or lubricants. The resultant shaped MOFs consequently do not comprise additional components, resulting in high quality materials exhibiting increased characteristics of the MOF. The shaped bodies can also be formed by a straightforward method, with minimal steps, thus lending itself readily to scale-up and commercialisation.

Typically, a stoichiometric ratio of the reactants is used when preparing MOFs. However, the inventors have advantageously determined that when a small excess of the second reactant is used, and the shaped MOF is formed directly from the starting materials, the compressive strength of the resulting shaped MOF is suitable for commercial application (i.e. 6.9 N/mm), in the absence of an external binder or lubricant. The process of the present invention therefore negates the need to use an eternal binder or lubricant, resulting in shaped MOFs with increased character of the MOF. In an embodiment, a molar excess of the second reactant is used. In an embodiment, a molar excess of 0.5-15% of the second reactant is used. In an embodiment, a molar excess of 1-10%, or of 2-7% of the second reactant is used.

The shaped body can have any suitable form and can be, for example, a pellet, monolith or rod-like extrudate. However, the shape of the body is not particularly limited, and can be tailored for instance to the intended commercial application.

The first reactant may be a salt, or in salt form, such as a nitrate, nitrite, oxide, hydroxide, alkoxide, aryloxide, carbonate, sulphate, hydrogen sulphate, acetate, formate, benzoate, acetylacetonate, fluoride, chloride, bromide, iodide, or tartrate, hydrogen carbonate, phosphate, hydrogen phosphate, dihydrogen phosphate or sulfonate.

In an embodiment, the metal is selected from Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb, Bi, Li, Na, K, Rb, Be, Tb, Gd, Ce and La.

Suitable metal ions include $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $V^{2+}$, $Nb^{3+}$, $Ta^{3+}$, $Cr^{4+}$, $Cr^{3+}$, $Cr^{2+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, $Li^+$, $Na^+$, $K^+$, $Rb^+$, $Be^{2+}$, $Tb^{3+}$, $Gd^{3+}$, $Ce^{3+}$ and $La^{3+}$.

In an embodiment, the metal is selected from Zn, Co, Mg, Cu, Al, Tb, Gd, Ce, La, Fe, Li, Sc, Mn, Cr, Ti, Zr, Ni, Si, and combinations thereof.

In an embodiment, the metal is selected from Zn and Cu.

In an embodiment, the metal is Cu, and the molar excess of the second reactant is from 1-10%, or from 2-7%.

In an embodiment, the metal is Zn, and the molar excess of the second reactant is from 0.5-10%, or from 1-7%.

In an embodiment, the second reactant is an alkoxide, aryloxide, imidazole, imidazolate, carboxylate, pyridine, amine, carboxylic acid, diacid and/or triacid moiety.

In an embodiment, the second reactant is an imidazole, imidazolate, pyridine, and/or carboxylic acid moiety.

In an embodiment, the second reactant is a carboxylic acid. The carboxylic acid may be a tricarboxylic acid. The second reactant may be an imidazole. The imidazole may be imidazole, 2-methyl imidazole, 2-ethyl imidazole or benzimidazole.

In an embodiment of the invention, the shaped body is formed directly from the mixture of step c) without any additional components being added. That is, the shaped bodies are formed from a mixture consisting of the starting materials for the MOF (i.e. the at least one metal ion and the at least one organic ligand, and the solvent, only). In this embodiment, no other components are present. In particular, the mixture does not comprise any binders or lubricants. The mixture does not include any of polyethylene oxide, polysaccharide Zusoplast PS1 or Zusoplast PS1.

In an embodiment, the at least one organic ligand is at least one at least bidentate organic bridging ligand. In the context of the present invention, the term "at least bidentate organic compound" is used to refer to an organic compound which is able to form at least two, preferably two, coordinative bonds to a given metal ion and/or to form one coordinative bond each to two or more, preferably two, metal atoms.

By "directly" it is meant that no additional components are added to the mixture of step b) before the shaped body is formed. The formation of the shaped body can occur as a separate step (for instance on an alternative piece of equipment), or it can occur as part of a continuous process (for instance where the process of steps a) to c) is carried out as a continuous process on an extruder or continuous kneader. When the shaping takes place as a separate step, the formation of the MOF, i.e. steps a) and b) can be carried out by any means, e.g. solvothermally, and the shaped body then formed in step c) using an extruder or continuous kneader.

Advantageously, therefore, the process can be run as a "one-step" process. In this embodiment, the shaped body can be formed directly in a single step from the starting materials. For instance, the starting materials can be added to an extruder, and the exit port of the extruder fitted with an appropriate die, such that shaped MOFs can be formed directly in a single-step process, which is commercially very advantageous. Unlike conventional techniques, therefore, in which MOFs are prepared in powder form, and then transferred to a mechanical press to be shaped, the MOFs can be prepared directly in shaped form in the process of the invention.

By a "single step" or "one step" process, it is intended to convey that a shaped MOF can be formed directly from the starting materials, without any intermediate intervention required by the operator. That is, the starting materials can be added to a suitable device, such as an extruder or continuous kneader, with the process parameters (screw rotation speed, residence time, temperature etc.) being programmed or pre-programmed, and the shaped MOF can be obtained directly at the exit port of the device.

In an embodiment, the shaped body has a crush strength of at least 6.9 N/mm. In an embodiment, the shaped body has a crush strength in the range of 6.5 to 35 N/mm. In an embodiment the shaped body has a crush strength in the range of 6.9 to 33.6 N/mm.

The crush strength can be measured according to procedures known to one skilled in the art, for example according to ASTM D4179.

In an embodiment, a solvent can be included in the mixture of step a).

Suitable solvents are known to those of skill in the art and include, for example, hydrocarbons, alcohols, water, amides, amines, esters, ionic liquids, carboxylic acids, bases, ethers, halogenated solvents, aromatic solvents, sulfoxides, or combinations thereof.

In an embodiment, the solvent is an alcohol. The alcohol may be methanol or ethanol. In an embodiment, the solvent is methanol.

In an alternative embodiment, the mixture does not include a solvent. In this embodiment, the process is a solvent-free process.

In an embodiment, the shaped body is formed by the application of low pressure. By low pressure, it is meant a pressure of less than approximately 100 bar (1,450 psi). While the pressure will vary along the length of the extruder barrel, it is believed that at no point does the pressure exceed ~100 bar (1,450 psi).

Advantageously, the process of the present invention allows the shaped bodies to be formed by the application of low pressure. This ensures that the surface area of the shaped MOF is not significantly impacted by the shaping process, allowing high surface areas to be retained. In an embodiment, the BET surface area of the shaped MOF is >1,000 $m^2/g$, or greater than 1,200, 1,300, 1,400 or 1,500 $m^2/g$.

In an embodiment, each of steps a) to c) is performed on an extruder or continuous kneader. The reactants, and optionally a solvent, can be added to the feeder of the device, and the shaped MOF produced directly For instance, the reactants, and optionally a solvent, can be added to the extruder feeder and the shaped MOF produced directly by extrusion. In this embodiment, a die can be used at the exit port of the extruder to produce shaped bodies directly. In this way, the process can be run as a continuous process.

When the device is an extruder, the extruder may be a screw-based extruder. The screw-based extruder may be a twin-screw extruder. The extrusion may be co-rotating. Alternatively, the extrusion may be counter-rotating.

Co-rotating systems can achieve a good level of mixing and conveying of materials and can also be operated at high speeds and therefore achieve high output rates. They are less prone to wear than counter-rotating systems.

In an embodiment, the process is a continuous process.

DRAWINGS

FIG. 1 shows crush strength of the CuBTC pellets as a function of TMA concentration.

EXAMPLES

The following examples are not intended to limit the scope of the invention, which is defined by the appended claims, but are illustrative only.
Materials and Methods Extrusion was performed on a Three Tex Extruder ZE-12 Model (AB-14-21375).

Crush strength was measured according to ASTM D 6175-03.

Example 1

Preparation of CuBTC (Copper Benzene-1,3,5-Tricarboxylate) Shaped Bodies

Copper hydroxide (205 g, 2.1 moles) and Trimesic acid (309.5 g, 1.47 moles) (molar ratio 3:2.1) were blended in a v-blender for 30 minutes (molar excess of second reactant of 5%). This powder was added to the feeder of the extruder. The extruder screw speed was set to 150 rpm, the gravimetric feed rate was set to 5 g/min and the liquid flow rate to 3.5 ml/min. The extruder was set up with 2 mm die face to produce shaped pellets with 2 mm diameter. The pellets exiting the extruder were dried at 150° C. for 2 hours and then activated for 1 hour at 200° C.

The measured BET surface area of the pellets was 1302 $m^2/g$. Analysis of the composition of the pellets yielded a reading of 11.26 wt % trimesic acid.

The crush strength of the pellets as measured by ASTM D 6175-03 was 8.84 N/mm.

Example 2

Preparation of ZIF-8 Shaped Bodies

Zinc Oxide (340 g, 4.18 mol) and 2-methyl imidazole (652 g, 7.94 mol) (molar excess of second reactant of 5.3%), were volumetrically fed into a Three Tec twin screw extruder at rate of 100 g/hr. A 0.5 M acetic acid in methanol solution was co-fed into a heated extruder barrel (50° C.) at a rate of 120 ml/hr. The co-rotating twin screws were operated at a speed of 100 rpm. The resulting extrudates were collected on a tray and dried in vacuum oven at 50° C. for 1 hour, with additional heat treatment at 150° C. for 16 hours. The activated extrudates yielded a BET surface area of 1736 $m^2/g$, and radial crush strength (ASTM D 6175-03) of 10.4 N/mm.

Reference Example

Preparation of CuBTC Shaped Bodies at Alternative Ratios

The process of example 1 was repeated with Copper hydroxide (205 g, 2.1 moles) and Trimesic acid (294.75 g, 1.4 moles) at a molar ratio of 3:2 (i.e. stoichiometric). The pellet was subject to BET surface area analysis which gave a result of 1,650 $m^2/g$. Measurement of the strength of the pellets by ASTM D 6175-03 gave a result of 1.3 N/mm. Analysis of the composition of the pellets yielded a weight percentage of 0.83% of trimesic acid.

Evaluation of Trimesic Acid Content Versus Crush Strength

The amount of trimesic acid present in the pellets was determined by titration of the trimesic acid against a standard sodium hydroxide solution. The trimesic acid in the pellets was first isolated by stirring of the pellets in methanol to extract them.

A graph of the trimesic acid content versus crush strength is shown in FIG. 1.

The results show that shaped bodies or pellets having sufficient crush strength for commercial application can be produced directly from the starting reactants for the MOF, and in the absence of an external binder or lubricant. Advantageously, this means that the resultant MOFs exhibit increased character of the MOF and retain high BET surface areas. Conversely, when the ratios of the starting materials are not carefully controlled, the resultant shaped bodies exhibited poor crush strength (i.e. <6.9 N/mm), and would typically require a binder or lubricant to be formed into commercially useful shaped bodies.

The invention claimed is:

1. A process for the preparation of a shaped MOF, the process comprising:
   a) providing a first reactant comprising at least one metal in ionic form and a second reactant comprising at least one organic ligand capable of associating with said metal in ionic form, and optionally a solvent;
   b) allowing the first and second reactants to react to form a MOF; and
   c) forming a shaped body directly from the mixture of step b) using an extruder or continuous kneader;
   wherein the initial ratio of the at least one metal in ionic form to the at least one organic ligand is controlled such that shaped bodies having a crush strength of at least 6.9 N/mm are formed without the use of an external binder or lubricant;
   and wherein there is a molar excess of 1-15% of the second reactant.

2. A process as claimed in claim 1, wherein the at least one metal is selected from Zn, Co, Mg, Cu, Al, Tb, Gd, Ce, La, Fe, Li, Sc, Mn, Cr, Ti, Zr, Ni, Si, and combinations thereof.

3. The process as claimed in claim 1, wherein the second reactant is an alkoxide, aryloxide, imidazole, imidazolate, carboxylate, pyridine, amine, carboxylic acid, diacid and/or triacid moiety.

4. The process of claim 1, wherein the shaped body is formed by the application of pressure at less than 100 bar (1,400.5 psi).

5. The process of claim 1, wherein each of steps a) to c) is performed on an extruder or continuous kneader.

6. The process of claim 1, wherein the process is a continuous process.

7. The process of claim 1, wherein the process is a one-step process.

8. The process of claim 1, wherein the second reactant is included at a molar excess of between 1.1 and 15%.

* * * * *